H. HUEG.
BAKER'S OVEN.
APPLICATION FILED JUNE 11, 1907.
917,299.
Patented Apr. 6, 1909.
3 SHEETS—SHEET 3.
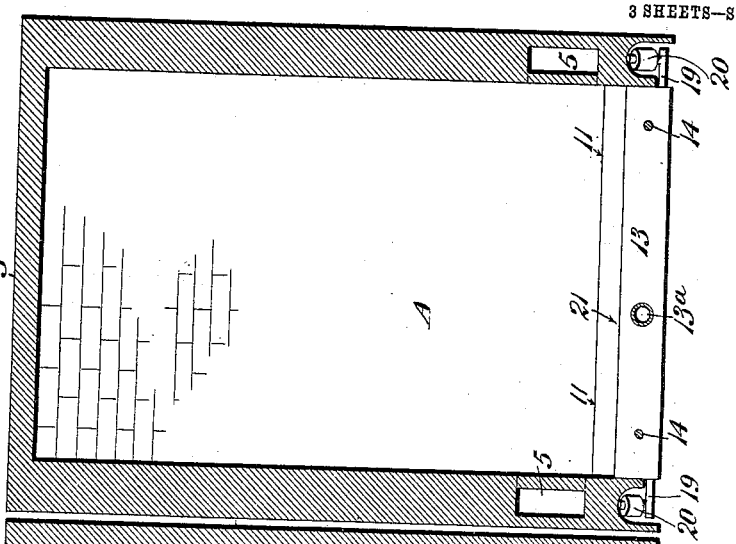
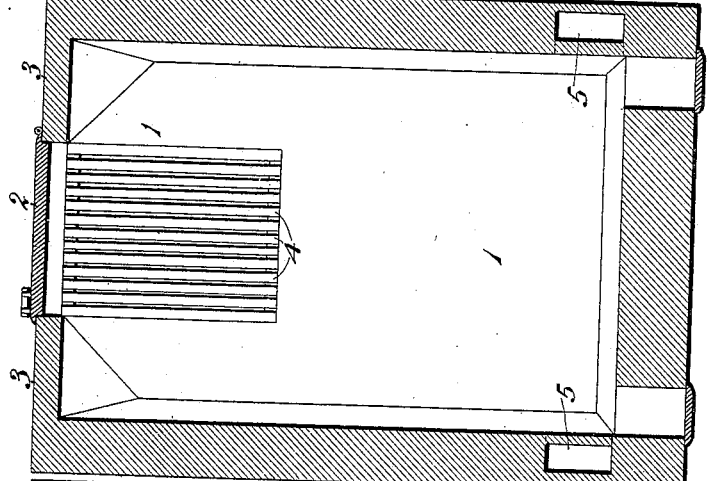
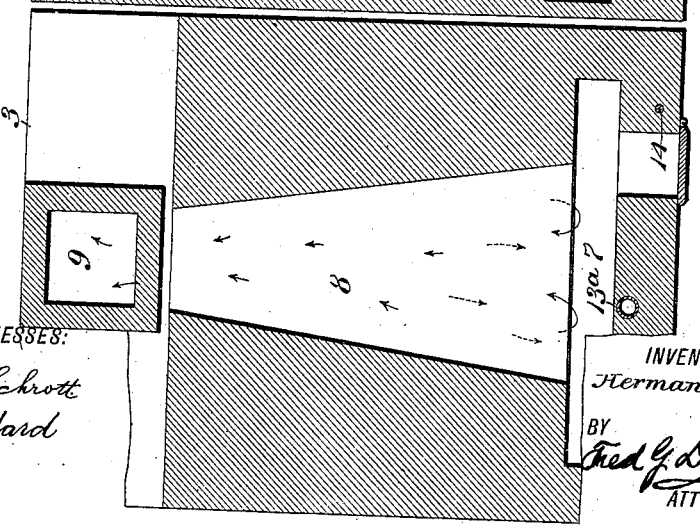
WITNESSES:
John T. Schrott
H. Woodard
INVENTOR
Herman Hueg.
BY
Fred G. Dieterich
ATTORNEYS.

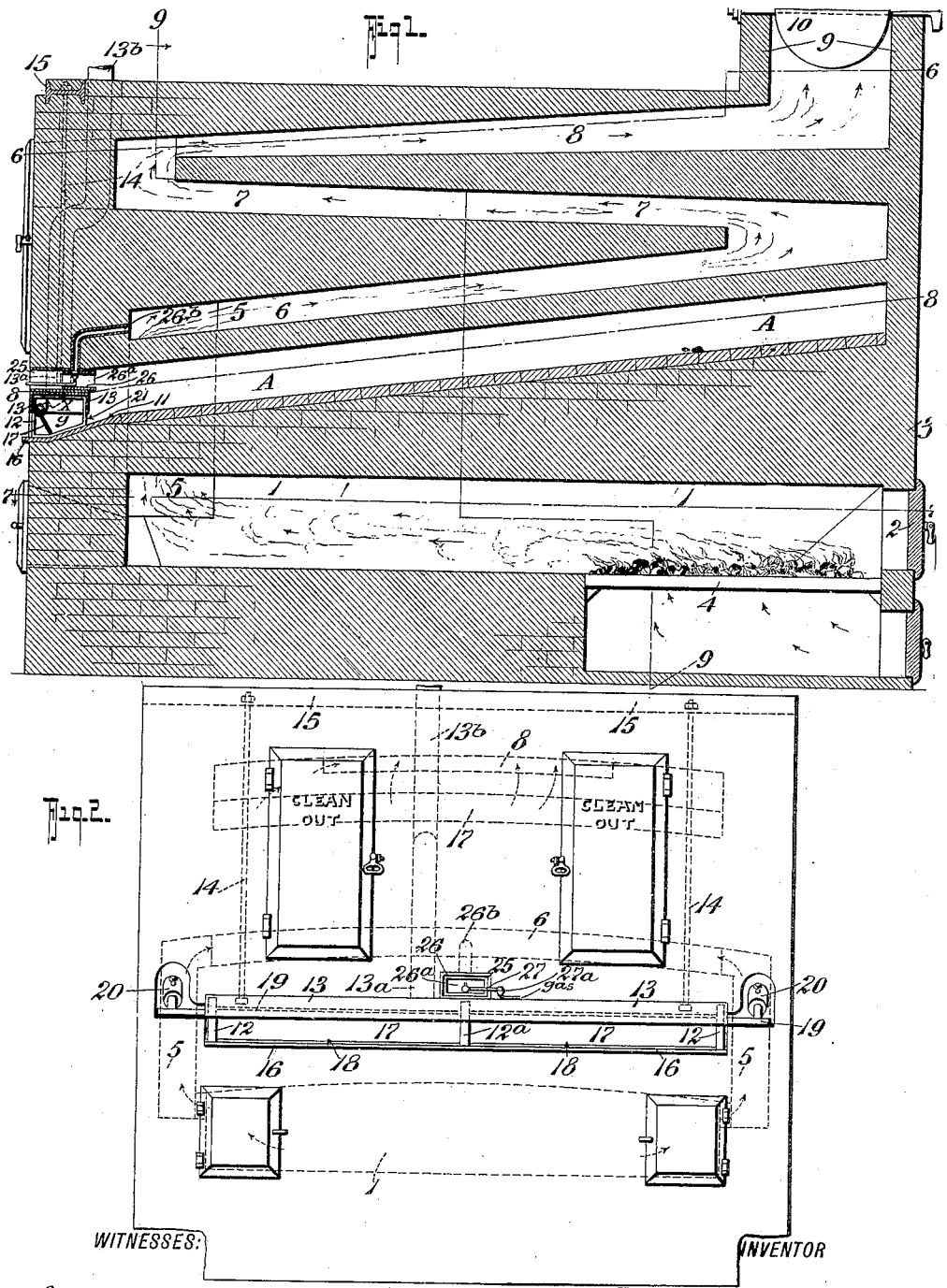

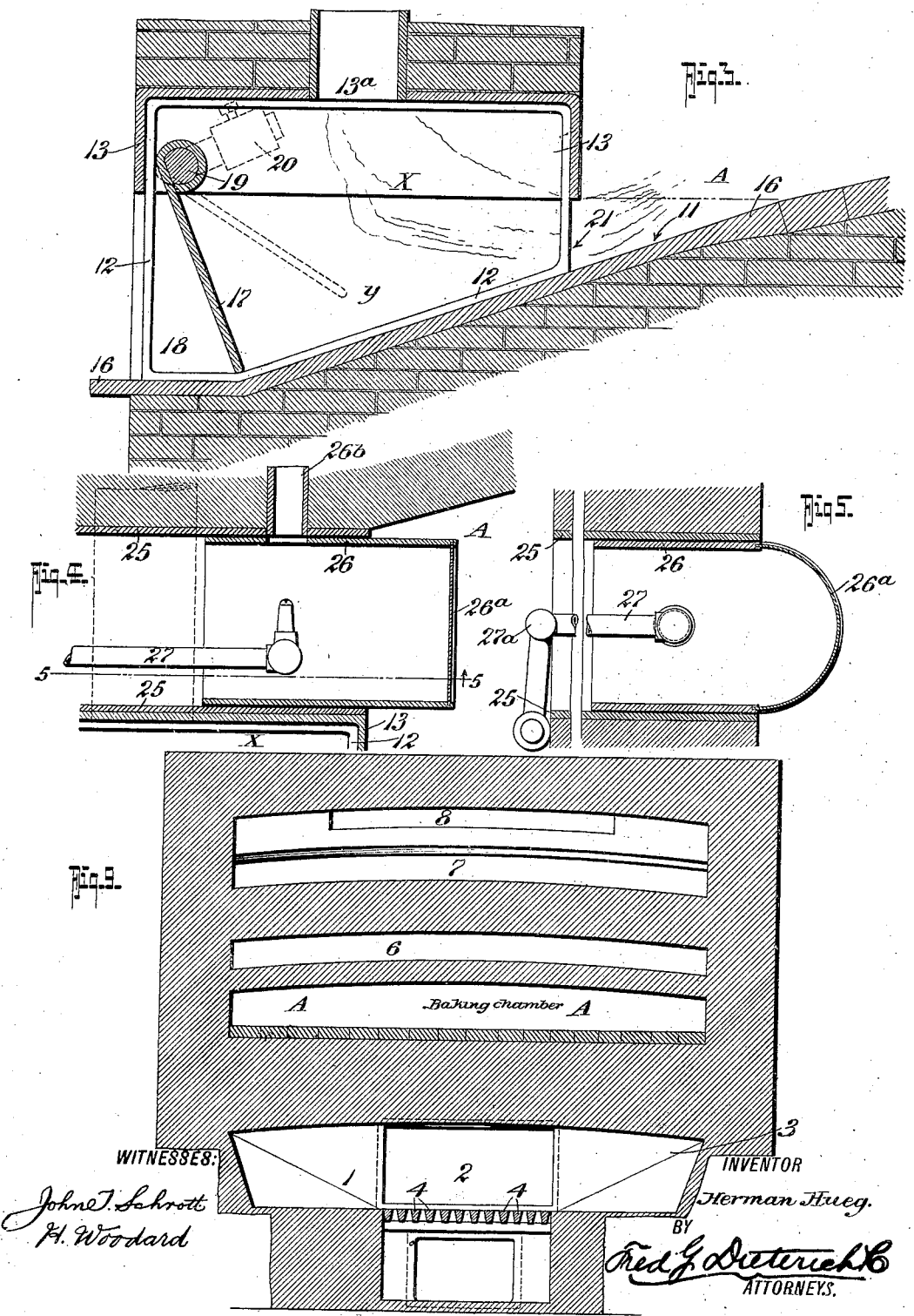

UNITED STATES PATENT OFFICE.

HERMAN HUEG, OF LONG ISLAND CITY, NEW YORK.

BAKER'S OVEN.

No. 917,299.

Specification of Letters Patent.

Patented April 6, 1909.

Application filed June 11, 1907. Serial No. 378,410.

*To all whom it may concern:*

Be it known that I, HERMAN HUEG, residing at Long Island City, in the county of Queens and State of New York, have invented a new and Improved Baker's Oven, of which the following is a specification.

My present invention relates generally to bakers' ovens and it primarily seeks to provide an improved construction of oven having such coöperative arrangement of parts, whereby to prevent the steam within the baking chamber from exhausting into the bake shop, during the operation of passing the material to be baked through the oven doors.

My invention, in its more complete make up, embodies an improved construction of the entrant end of the baking chamber, which includes means for trapping the steam so it can not escape through the oven doors without touching the bake stuff, and means for directing the surplus steam outside of the bake shop.

My invention also comprehends an improved arrangement of the oven light box.

With other objects in view which will be hereinafter explained, my invention consists in certain details of construction and peculiar combination of parts, all of which will hereinafter be fully described, specifically pointed out in the appended claims and illustrated in the accompanying drawings, in which:—

Figure 1, is a longitudinal section of my improved construction of baker's oven, the direction of the products of combustion from the furnace being indicated by the arrows. Fig. 2, is a front view of the oven. Fig. 3, is an enlarged, longitudinal section of the entrant end of the baking chamber, showing the means for trapping the steam and exhausting the surplus steam. Fig. 4, is a similar view of the light box devices. Fig. 5, is a horizontal section thereof on the line 5—5 on Fig. 4. Figs. 6, 7 and 8 are horizontal sections of my oven taken respectively on the line 6—6, 7—7 and 8—8 on Fig. 1. Fig. 9, is a transverse section of the oven taken on the line 9—9 on Fig. 1.

In the practical construction my oven comprises the brick housing built with a furnace 1 directly over its base, which is of the full width and length thereof. This furnace is fired through a door way 2 in the rear wall 3 of the housing and just inside said doorway 2, the furnace floor has a grate surface 4, located over the ash pit as usual. Located above the furnace and also of substantially the full width and length of the housing is the baking chamber A, the arrangement of which and particularly the construction of the entrant end thereof, forms the most essential feature of my present invention, as will presently more fully appear. The furnace 1 discharges into two flues 5, located one in each of the front corners of the housing, and these flues carry the products of combustion into a horizontal flue 6 located over the baking chamber and which extends to near the back wall at which point it discharges into another horizontal flue 7 that inclines upwardly toward the front wall of the housing, where it merges with a rearwardly extended tapering flue 8 that discharges into the chimney 9, in practice, provided with the usual damper 10 for controlling the oven, as clearly shown in Fig. 1.

It will be noticed by referring to Figs. 1 and 3, the baking chamber is inclined upwardly and near its mouth it has an abrupt downward incline as indicated by 11, the purpose of which will presently appear. Within the entrant or mouth end of the baking chamber is built a cast metal framing, which consists of the two vertical end castings 12 and a centrally disposed vertical casting 12$^a$. These castings are connected and closed at the top by an angle plate 13 to which they are secured. These plates are suspended on hanger bolts 14—14 supported from the I beam 15 built in the top of the housing front and extending the full width thereof, as shown in dotted lines on Fig. 2. By supporting the angle plates 13 as described and shown, ample means is provided for sustaining the brick wall above the entrant end of the baking chamber.

16 designates a metal bottom plate, upon which the castings 12 and 12$^a$ rest and which cover the full surface of the abruptly inclined bottom portion 11 of the baking chamber.

As clearly shown in Fig. 3, the back and front lower ends of the top or angle plate 13 are in the horizontal plane of the beginning of gradually inclined bottom of the baking chamber, whereby to cause the steam, as it passes toward the baking chamber opening, to become trapped within the supplemental chamber X that forms the entrant end of the baking chamber, which chamber X is normally closed by the two doors 17—17 that close the openings 18—18 as shown. Each of the angle or top plates 13 has a central outlet 13ª that connects with an off-take flue 13ᵇ for conveying the surplus steam outside the bake oven. The doors 17—17 are mounted upon a cross bolt 19 that extends transversely of the chamber X through the three end castings 12 and 12ª and said doors are so hung that they automatically swing to a closure position, the bolt 19 having counterweights 20—20 to insure the positive downward or closure pressure in the doors at all times. The bolt 19, it will be noticed, lies in a plane level with the bottom line of the bake chamber floor, and the bake stuff feed opening 21 is in a plane below said chamber floor.

By arranging the feed opening, the doors therefor and the throatway y between the chambers X and A, it follows that a positive trapping or deflection of the steam is provided for, since the steam will at all times take the course indicated on Fig. 3, it being manifest that in pushing the bake stuff under the doors 17, any steam that tends to flow past the doors can not leave the baking chamber until after it touches the bake stuff and hence in escaping, it gives the bake stuff a glossy, and crisp appearance.

In my construction of oven, I provide a single light box located midway the baking chamber and just above the angle plate 13 upon which it is supported as shown in Figs. 1 and 2. This box comprises a stationary casing 25 and a movable casing 26 that slides within the casing 25. The casing 26 is made semicircular at its inner end and is framed to receive the mica plate 26ª. The light is furnished by a gas bracket 27 hinged at 27ª so it can be readily withdrawn from the light box. The smoke from the gas jet is carried up through the outlet 26ᵇ in the casing to the oven flues. By reason of the peculiar construction of the light box but a single light box will be necessary for the baking chamber, and since the products of combustion the gas smoke is carried off into the stock or chimney flues, it follows that danger of burning out the mica is reduced to the minimum.

Since the feed opening for the baking chamber extends the full width of the said chamber as clearly shown in Fig. 8, a great advantage of operation is obtained, since the operator that works on the oven can have his bake stuff under better control than is possible with the ordinary type of ovens that have the usual restricted or central doorway or feed opening. Again, by reason of locating the light box directly over the doorway and centrally thereof another very desirable advantage is acquired, as but one light box is necessary, and the interior of the baking chamber can be readily noted by the operator without the necessity of going to the opposite ends of the oven which usually have their light boxes on the sides.

Having thus described my invention, what I claim is:

1. In a baker's oven, a steam exhausting flue, means for retarding the escape of the steam through the entrant end of the baking chamber and deflecting the steam toward the exhausts as the doors thereof are opened to insert the bake stuff.

2. In a baker's oven, in combination with the baking chamber; of a supplemental chamber at the entrant end thereof, having a throatway communicating with the baking chamber, an opening for the passage of the bake stuff, and an automatic means located at the front of the said chamber for normally closing said opening.

3. In a baker's oven the combination with the baking chamber and a supplemental chamber at the front thereof a throat way that connects the two chambers and an exhaust that opens into the supplemental chamber; of a door for closing off the supplemental and the baking chambers and automatic means for pressing said door to a closing position as set forth.

4. In combination with the baking chamber; of a supplemental chamber connected with the baking chamber by a throatway, said supplemental chamber having a feed opening in a plane below the bottom of the baking chamber and having a steam exhaust connected with the crown thereof.

5. The combination with the baking chamber; of a supplemental chamber at the front end of said baking chamber, said two chambers being connected by a throatway, the supplemental chamber having a feed opening located in a plane below the bottom of the baking chamber, an automatically closing hinged door for the feed opening located within the supplemental chamber, and an offtake flue in the upper end of the supplemental chamber for leading off the surplus steam, as set forth.

6. In an oven as described, the combination with the baking chamber; of a supplemental chamber at the front end of the baking chamber, said chambers having a throat connection, the supplemental chamber having a downwardly inclined bottom and comprising the end and intermediate vertical castings, the top angle plate, means for suspending the said angle plate, doors hinged on the vertical castings and weighted to automatically close down against the bottom plate, said doors being positioned in a plane below the bottom of the baking chamber and a steam offtake connected with the top of the supplemental chamber, as set forth.

7. In a baker's oven of the character described, in combination with the baking chamber doorways; of a light box mounted over the doorway comprising an outer casing and an inner casing slidable in the outer casing, and having its inner end formed as a mica carrying frame, substantially as shown and described.

8. A light box for bakers' ovens, comprising a tubular outer casing adapted to be mounted over the baking chamber entrant end, an inner casing slidable in the outer casing, having its inner end convexed and framed to hold a transparent member such as mica, a swinging bracket light projected into said inner and outer casings, and an offtake connected with the casing for carrying off the light smoke, as set forth.

9. A baking oven, comprising in combination with the baking chamber, having means at the entrant end for trapping and deflecting the exhaust steam, of a furnace located under the baking chamber having a firing inlet under the rear end of the baking chamber, backward and forward horizontal flue sections located above the baking chamber and above each other and in connection with the furnace at the front end of the oven and a stack located at the rear end of the oven into which the said furnace flues discharge, all being arranged substantially as shown and described.

10. A baker's oven provided with side walls, a beam supported thereon at its ends and having a depending rear flange and a front flange, and a door hingedly mounted within and adjacent to the depending front flange and extending the entire width of the oven.

HERMAN HUEG.

Witnesses:
JACOB FRIEAUFF,
LOUIS W. HUEG.